(12) United States Patent
Schonlau et al.

(10) Patent No.: US 6,477,935 B1
(45) Date of Patent: Nov. 12, 2002

(54) VACUUM BRAKE BOOSTER

(75) Inventors: Jürgen Schonlau, Walluf (DE); Ralf Harth, Darmstadt (DE); Uwe Kley, Usingen (DE); Rolf Fellinger, Dreikirchen (DE); Steffen Linkenbach, Eschborn-Niederhöchstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/787,817
(22) PCT Filed: Jul. 16, 1999
(86) PCT No.: PCT/EP99/05095
§ 371 (c)(1), (2), (4) Date: May 16, 2001
(87) PCT Pub. No.: WO00/18627
PCT Pub. Date: Apr. 6, 2000

(30) Foreign Application Priority Data

Sep. 26, 1998 (DE) .......................................... 198 44 233

(51) Int. Cl.[7] .................................................. F15B 9/10
(52) U.S. Cl. ........................................ 91/376 R; 92/78
(58) Field of Search ............................ 91/369.1, 369.2, 91/376 R; 92/78

(56) References Cited

U.S. PATENT DOCUMENTS 4,953,446 A   9/1990   Fecher et al. .............. 91/369.1
5,518,305 A * 5/1996   Jakobi et al. .............. 91/369.2
5,520,086 A   5/1996   Ikeda ........................ 91/376 R

FOREIGN PATENT DOCUMENTS

| DE | 29 18 734 | 11/1980 |
| DE | 34 13 739 | 10/1985 |
| DE | 89 08 040 | 10/1990 |
| DE | 195 37 660 | 4/1997 |
| GB | 2 051 270 | 1/1981 |
| GB | 2 294 100 | 4/1996 |

OTHER PUBLICATIONS

Search Report of the German Patent Office for Application No. 198 44 233.5.

* cited by examiner

Primary Examiner—Edward K. Look
Assistant Examiner—Thomas E. Lazo
(74) Attorney, Agent, or Firm—Rader, Fishman & Grauer PLLC

(57) ABSTRACT

The present invention relates to a vacuum brake force booster which includes a valve piston with a pedal push rod that is axially slidable in a vacuum housing, further including a control housing and a poppet valve connected to the valve piston, and an air filter. The air filter is arranged in the valve piston and forms, in conjunction with an associated valve piston sealing seat for the air filter abuttable thereon, a variable flow cross-section for the outside air that flows through the poppet valve.

11 Claims, 3 Drawing Sheets

VACUUM BRAKE BOOSTER

TECHNICAL FIELD

The present invention generally relates to brake systems, and more particularly relates to an improved vacuum brake force booster for use in a hydraulic brake system.

BACKGROUND OF THE INVENTION

Vacuum brake force boosters in many applications are known in the automotive industry. The brake force is typically transmitted to the vacuum brake force booster by way of the pedal push rod which is in connection to a brake pedal, and ultimately to the master cylinder connected to the booster. The same vacuum prevails on both sides of the diaphragm plate in the release or ready position. An associated compression spring within the vacuum housing or pneumatic cylinder pressure housing retains the diaphragm plate in its initial position. An associated vacuum channel is open which pneumatically separates the two cylinder chambers from each other by way of the poppet valve.

Upon application of the brake pedal, the above-mentioned vacuum channel is initially closed by the valve piston with the connected poppet valve, and an outside air channel is opened in the further course of the movement so that the vacuum which prevails in the working pressure chamber is decreased. Consequently, there is a difference in pressure between the front and the rear chamber of the booster (pedal-side working pressure chamber or booster chamber) which pushes the diaphragm plate in the direction of the connected (tandem) master cylinder and thus generates the pedal force. The brake boosting or auxiliary force which is so produced is rated by the product of differential pressure and diaphragm plate surface. The above-mentioned vacuum reduction in the booster chamber is effected until the hydraulic pressure generated in the connected master cylinder makes the valve piston come to standstill. Simultaneously, the poppet valve interrupts the supply of outside air. Now a ready position is reached where each slight variation of the pressure at the brake pedal causes an increase or decrease of the pressure difference on both sides of the diaphragm plate and, thus, an increase or reduction in slowing down.

In the so-called brake's fully applied position, the vacuum channel is closed and the outside air channel is constantly open. The result is that the maximum pressure difference and, hence, maximum brake force boosting prevails on both sides of the diaphragm plate. Further increase of the brake force is possible only by increase of the pedal force.

In a vacuum brake force booster of the design initially described, there is provision of an air filter which is principally arranged in a sleeve that encompasses the pedal push rod. In addition, it is suggested to apply sound-absorbing material configured as a hollow-cylinder shaped lining to the inside wall of the sleeve, and the above-mentioned sound-absorbing material encompasses the pedal push rod at a radial distance therefrom so that the air which flows through an annular channel flows along the sound-absorbing lining. Attempts have been made with this arrangement to considerably absorb the noise of air aspiration in a vacuum brake force booster without increasing the diameter in the area of the air-conveying channels and without extending the response time of the brake force booster (see German patent specification 29 18 734).

The above-mentioned embodiment still suffers from disadvantages, especially with respect to the expenditure in manufacture. Thus, it is necessary in this embodiment to cement the hollow-cylindrical lining of sound-absorbing material to the sleeve. It is scarcely possible to automate such processes and, on top of this, manufacturing inaccuracies are difficult to master. The present invention is directed to this issue.

A technical object of the present invention is to improve upon a vacuum brake force booster of the design described hereinabove so that a simple and low-cost manufacture is achieved along with proper filtering and/or sound absorption of the outside air.

This object is achieved by the present invention in a generic brake force booster in that the air filter is arranged in or at the valve piston and, in conjunction with an associated valve piston sealing seat (for the air filter abuttable thereon), forms a variable flow cross-section for the outside air that flows through the poppet valve. The outside air flows through the air filter and/or past it. With respect to its outside dimensions, the air filter can project from the valve piston sealing seat, end flush with the sealing seat of the valve piston, or be disposed flatly in the valve piston.

In a preferred embodiment, the air filter is an annular disc with a central bore for the pedal push rod extending therethrough. Consequently, a simple wholesale article of low-cost manufacture may be used. This applies especially for the case that the air filter is made from an elastic material of a predetermined flexibility, for example, a PUR (polyurethane) foam, or is designed rigidly. In addition or as an alternative, there is the possibility of connecting the air filter to the valve piston by means of a spring or any other elastically yielding or flexible element.

All these provisions are generally made because the valve piston sealing seat typically has at its rim a baffle plate with a protruding stop edge. This stop edge may project by a predetermined extent from a valve seat plane defined by the valve seat. Of course, a receding type of construction is also possible. The stop edge will regularly plunge into the air filter, when the air filter bears against the valve seat or has lifted from the valve seat by a predetermined slot size, so that outside air which flows through the poppet valve is forced to pass the air filter. Consequently, the outside air is initially conducted through an annular channel between the pedal push rod and the sleeve which receives the pedal push rod, and then in an S shape through the air filter and into the working pressure chamber. This arrangement achieves a proper sound absorption in the above-mentioned position of the valve piston or the poppet valve because the outside air which flows into the working pressure chamber must obligatorily pass the air filter (which is usually made of a foam material). Such a position generally corresponds to the ready position or partial braking position.

In full braking or a quick application of the brake pedal and, thus, of the pedal push rod (emergency braking), the air filter is removed from the valve seat by a predetermined opening rate. Simultaneously, the stop edge no longer plunges into the air filter, rather is lifted from the air filter. Thus, the stop edge along with the air filter defines an intake so that outside air which flows through the poppet valve is deviated by the air filter (S-shape) and flows in through the intake. In this case, too, proper sound absorption will be achieved and namely in such a way that the outside air which enters through the annular channel so-to-speak impinges on the air filter and is deviated by said into the intake. Thus, a sound absorption is done in two different ways: on the one hand, by the porous and sound-absorbing surface of the filter being an impingement surface and, on the other hand, by the deviation of the air flow.

An embodiment which is especially favorable under aspects of manufacture and assembly is characterized in that the valve piston includes on the side of the pedal push rod an extension of U-shaped cross-section, formed with a cavity for insertion of the air filter. This extension and the air filter can be designed rotationally symmetrically in comparison to the axis defined by the pedal rod. In general, the air filter and the extension are arranged coaxially and concentrically with respect to the centrally arranged pedal push rod.

The result is a structural unit which is especially simple to manufacture and easy to mount.

First of all, this is due to the air filter which can be configured as a punched plastic (foam) shaped part in the most simple case. The assembly is also easy because the valve piston includes a cavity for insertion which is conformed to the outside diameter of the air filter in a practical fashion and permits positioning the air filter without problems. An additional adhesive securement of the air filter in the insertion cavity is possible, but not absolutely necessary. Compared to the state of the art as disclosed in DE-PS 29 18 734, special designs on the sleeve which encompasses the pedal push rod become unnecessary, with the result of reduced manufacturing and assembly costs. At least the same noise-absorbing properties as in the state of the art, or even better ones, will be achieved. The air filter inheres a defined flexibility (elasticity) so that the air is either passed through it or past it. The latter action is required in particular upon a quick actuation of the valve piston, namely in connection with a quasi emergency braking. The above-mentioned mode of operation causes a particularly quick ventilation of the working pressure chamber or of the booster chamber because the entry of outside air takes place practically unimpededly. In the first-mentioned case, the flexibility of the filter element is sufficient to effect the conveying of the outside air through the filter by means of the baffle plate. The available flow cross-section is sufficient for normal service brake operations. These are the basic advantages of the present invention.

DETAILED DESCRIPTION OF THE PREFERRED EMBODIMENTS

Figure 1:
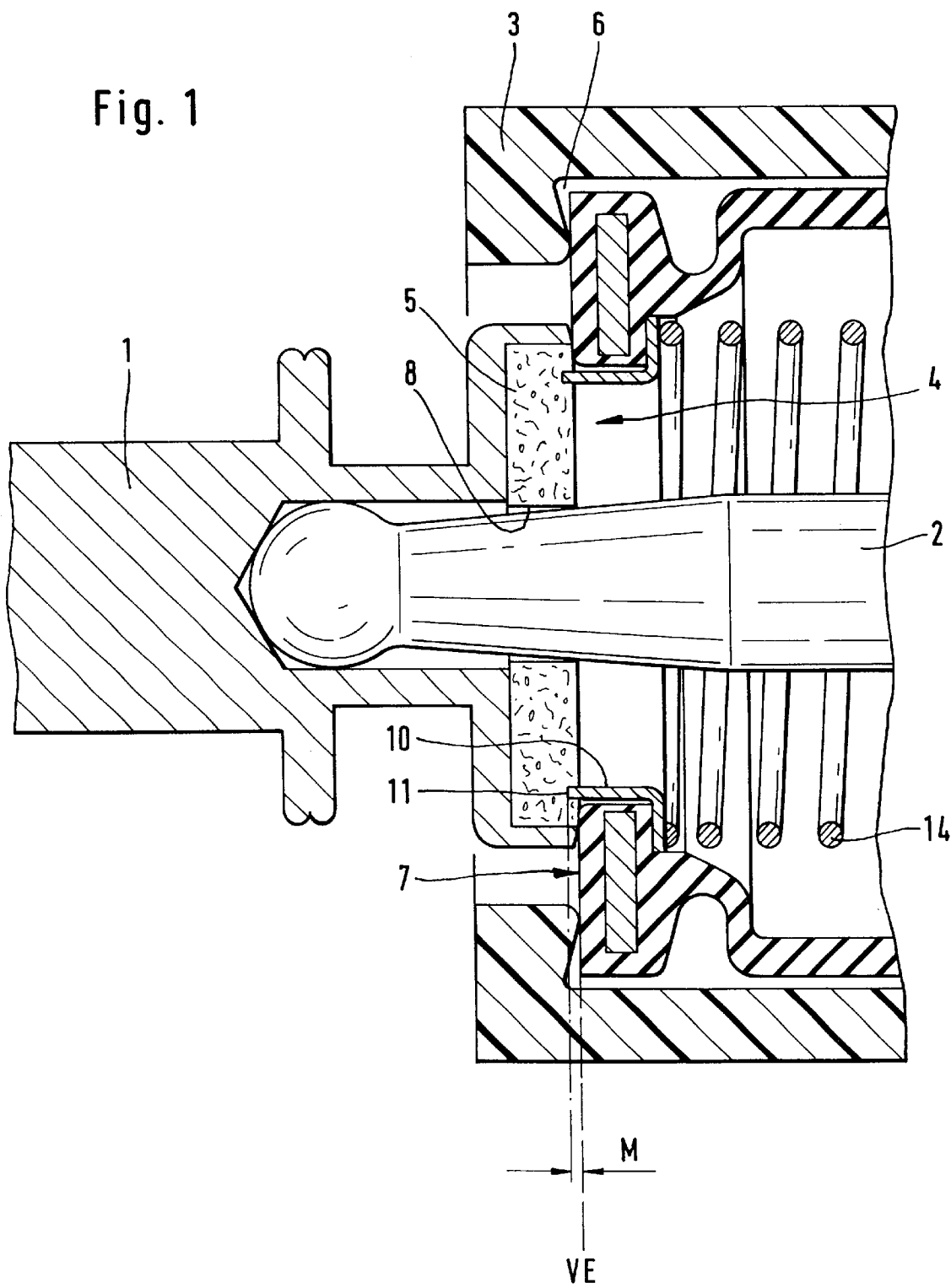
FIG. 1 is a cross-section taken through a vacuum brake force booster, and namely in the area of the control housing with valve piston.

The Figures show a section of a vacuum brake force booster which, in its principal design, includes a vacuum housing with a valve piston 1 with pedal push rod 2 slidable axially in the housing. The pedal push rod 2 is used to ventilate a working pressure chamber in front of a diaphragm plate in the course of braking. Consequently, the working pressure chamber is arranged on the pedal side of the diaphragm plate and is also referred to as booster chamber. In addition, there is a control housing 3 and a poppet valve 4 connected to the valve piston 1. There is still provision of an air filter 5 for cleaning and noise-absorption of the outside air which enters the vacuum housing or the working pressure chamber.

Actuation is effected as is conventional practice, reference being made to the introductory part of the description. In a short repetition: when the brake pedal is applied, the poppet valve 4 will initially close a vacuum channel 6 which connects the pedal-side booster chamber or working pressure chamber to the chamber on the other side of the diaphragm plate (see FIG. 1, 2a, and 3). In the further course of the movement, outside air propagates into the vacuum housing or the working pressure chamber.

For this purpose, the air filter 5 is arranged in the valve piston 1 and, in conjunction with an associated valve piston sealing seat 7 for the air filter 5 abuttable thereon, forms a variable flow cross-section for the outside air that flows through the poppet valve 4. This means the outside air flows in the way shown in FIGS. 2b and 2c through the poppet valve 4 (see FIG. 2b) respectively past it (see FIG. 2c).

In the present case, the air filter 5 is configured as an annular plate with a central bore 8 for the pedal push rod 2 extending therethrough. Air filter 5 is made of an elastic material, for example, PUR foam. A rigid design is also possible as an alternative. Besides, in another embodiment, the air filter can be connected to the valve piston 1 by means of a spring 9. Instead of the spring 9, any other elastically yielding element can be used at this point, that means, between the air filter 5 and the valve piston 1.

The annular valve piston sealing seat 7 includes at its rim a baffle plate 10 with a protruding stop edge 11. The above-mentioned stop edge 11 projects from a valve seat plane VE by a predetermined rate M. The valve seat plane VE is defined by the valve seat 7 which, in the present case, is configured as a circular ring and in its diameter is conformed to the cylindrical control housing 3. The circular valve seat 7 defines the mentioned valve seat plane VE. For the mounting support of the baffle plate 10, there is provision of a spring 14 which presses the baffle plate 10 against the bottom side of an opening enclosed by the circular valve seat 7. When the air filter 5 abuts on the valve seat 7, the stop edge 11 plunges into the air filter 5 so that outside air is prevented from entering. As soon as the air filter 5 has lifted from the valve seat 7 by a predetermined slot size S, outside air is permitted to enter through the mentioned slot into the working pressure chamber, namely by taking an S-course through the air filter 5 because the stop edge 11 plunges as before into the air filter 5. These geometrical conditions are shown especially in FIG. 2b.

When the air filter 5 is removed from the valve seat 7 by a predetermined rate of opening T, the stop edge 11 is lifted from the air filter 5. The rate of opening T is larger than the maximum slot size Smax which still ensures that the stop edge 11 plunges into the air filter 5. This means, T>S max applies.

For accommodation of the air filter 5, the valve piston 1 has an extension 12 that is U-shaped in cross-section and disposed on the side of the pedal push rod, and provides an insertion cavity 13 for the air filter 5. The extension 12 and the air filter 5 are designed rotationally symmetrically compared to the axis A defined by the pedal push rod 2. In addition, the air filter 5 and the extension 12 are arranged coaxially and concentrically with respect to the centrally arranged pedal push rod 2.

Figures 2A, 2B, 2C:
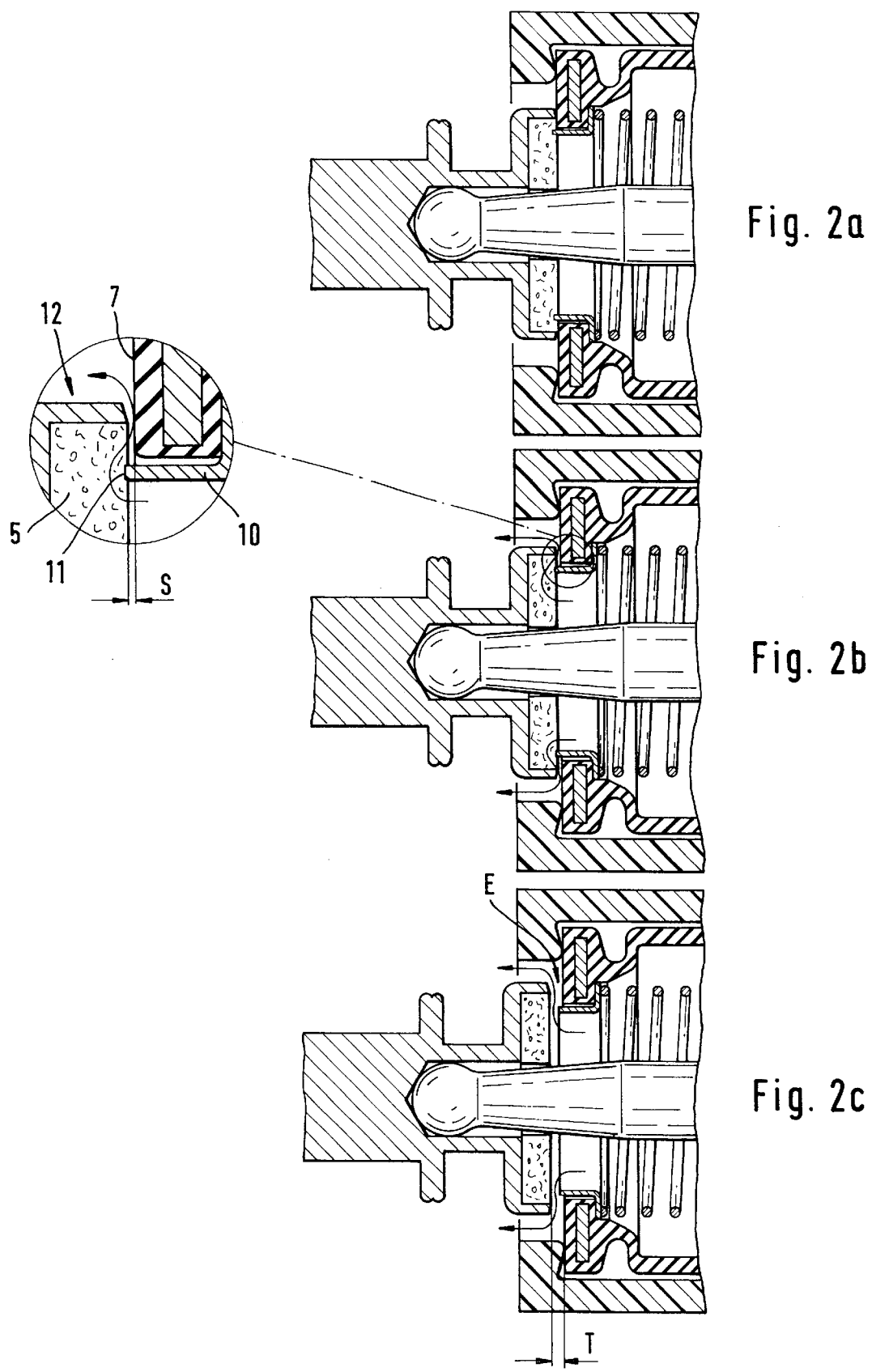
FIGS. 2a to 2c show various function positions of the valve piston with poppet valve.

In a partial braking operation or when the air filter 5 or the valve piston 1 lifts slightly from its valve seat 7, outside air propagates in the manner shown in FIG. 2b, bypassing the slot size S, through the air filter 5 into the working pressure chamber. The noise is consequently absorbed by the compulsory passage of air through the air filter 5. After the air filter 5 has been passed, the flow cross-section additionally opens practically conically in the type of a diffuser, which contributes to noise reduction even more.

The latter fact also applies to the case that a quick actuation of the pedal push rod 2 occurs or a full braking or emergency braking is requested. In contrast to the air passage referred to hereinabove, however, now an opening rate T between the valve seat 7 and the air filter 5 is realized, that means the stop edge 11 has lifted from the air filter 5. Accordingly, the air at this point can flow unimpededly past the air filter 5 and is only deviated here, and again in the way of an S. In this arrangement, stop edge 11 and air filter 5 define an intake E (see FIG. 2c). The noise is absorbed in such a fashion that initially the air flow is deviated twice, in addition, impinges on the porous air filter 5 upon inflow and, besides this, the diffuser-type extension of the flow cross-section described hereinabove is maintained.

Figure 3:
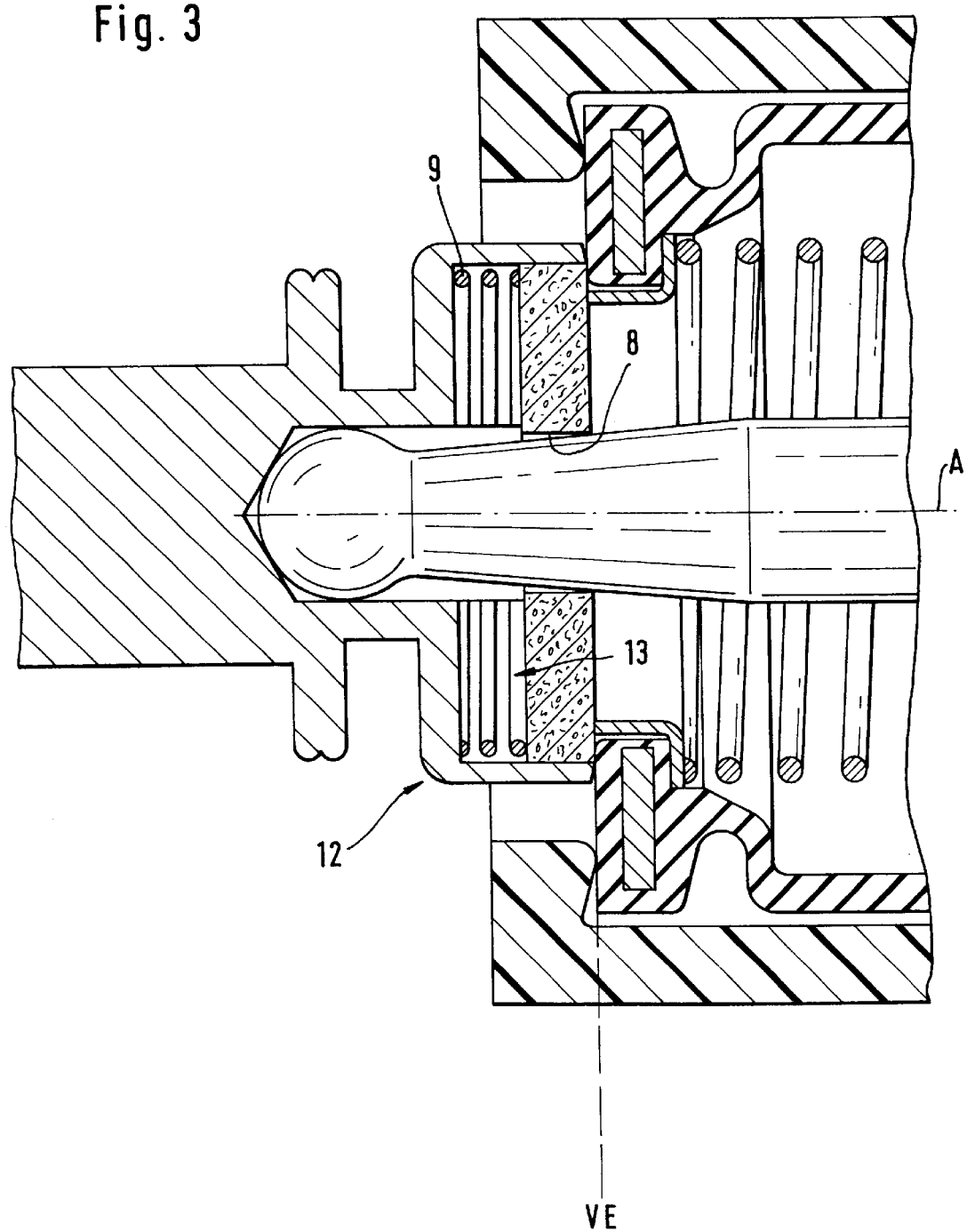
FIG. 3 shows another embodiment of the present invention.

Comparable advantages and effects apply to a variation of the invention, as it is shown in FIG. 3. There, the air filter 5 has a rigid design, and a spring 9 arranged between the air filter 5 and the valve piston 1 ensures a corresponding elastic flexibility. Spring 9 will yield when the valve piston 1 is actuated slowly so that the outside air flows in unimpededly through the air filter 5. Only when the opening rate T is reached will the spring 9 no longer yield, with the result that the stop edge 11 and the air filter 5 again form the intake E. Of course, the above variation is also possible in connection with an elastic air filter 5.

What is claimed is:

1. Vacuum brake force booster, comprising:
   a valve piston,
   a pedal push rod that is axially slidable in a vacuum housing, a poppet valve connected to the valve piston,
   an air filter, wherein the air filter is arranged in or in contact with the valve piston and wherein, in conjunction with an associated valve piston sealing seat, said air filter forms a variable flow cross-section for accommodating outside air that flows through the poppet valve.

2. Vacuum brake force booster as claimed in claim 1, wherein the air filter is configured as an annular disc with a central bore for accommodating the pedal push rod which extends therethrough.

3. Vacuum brake force booster as claimed in claim 1, wherein the air filter is made from an elastic material of a predetermined flexibility.

4. Vacuum brake force booster as claimed in claim 1, wherein the air filter is connected to the valve piston by means of an elastically flexible element.

5. The vacuum brake force booster as claimed in claim 4, wherein said elastically flexible element is a spring.

6. Vacuum brake force booster as claimed in claim 1, wherein the valve piston sealing seat has a rim portion which includes a baffle plate with a protruding stop edge.

7. Vacuum brake force booster as claimed in claim 1, wherein the stop edge projects by a predetermined distance from a valve seat plane defined by a generally planar surface of the valve seat, and plunges into the air filter, when the air filter bears against the valve seat or is located within a predetermined distance from the valve seat, so that outside air which flows through the poppet valve is forced to pass the air filter.

8. Vacuum brake force booster as claimed in claim 1, wherein when the air filter is separated from the valve seat by a predetermined opening rate, the stop edge lifts away from the air filter and defines an intake passage so that outside air which flows through the poppet valve is deviated by the air filter and flows through the intake passage.

9. Vacuum brake force booster as claimed in claim 1, wherein the valve piston includes an extension portion having a U-shaped cross-section, formed with an insertion cavity for housing the air filter.

10. Vacuum brake force booster as claimed in claim 9, wherein the extension and the air filter are designed rotationally symmetrical in comparison to the axis defined by the pedal push rod.

11. Vacuum brake force booster as claimed in claim 9, wherein the air filter and the extension are arranged coaxially and concentrically with respect to the centrally arranged pedal push rod.

* * * * *